United States Patent [19]

Nakamura et al.

[11] Patent Number: 4,887,210

[45] Date of Patent: Dec. 12, 1989

[54] DEPARTMENT LEVEL SETTING IN AN ELECTRONIC CASH REGISTER

[75] Inventors: Yasuhide Nakamura, Yamatokoriyama; Sigeyuki Yamamura, Tenri, both of Japan

[73] Assignee: Sharp Kabushiki Kaisha, Osaka, Japan

[21] Appl. No.: 625,004

[22] Filed: Jun. 26, 1984

[30] Foreign Application Priority Data

Jun. 30, 1983 [JP] Japan ............................ 58-120792

[51] Int. Cl.4 ........................................... G06F 15/21
[52] U.S. Cl. ................................................... 364/405
[58] Field of Search ...................... 364/405, 404–406; 377/13, 14, 26, 49

[56] References Cited

U.S. PATENT DOCUMENTS

| | | | |
|---|---|---|---|
| 3,956,745 | 5/1976 | Ellis | 340/365 VL |
| 4,028,695 | 6/1977 | Saich | 340/365 VL |
| 4,144,567 | 3/1979 | Tadakuma | 364/405 |
| 4,159,533 | 6/1979 | Sakurai | 364/405 |
| 4,293,911 | 10/1981 | Oonishi | 364/405 |
| 4,317,172 | 2/1982 | Nakano | 364/405 |
| 4,503,503 | 3/1985 | Suzuki | 364/405 |

*Primary Examiner*—Jerry Smith
*Assistant Examiner*—Gail O. Hayes
*Attorney, Agent, or Firm*—Birch, Stewart, Kolasch & Birch

[57] ABSTRACT

An electronic cash register includes thirty department keys for identifying the department of the commodity purchased by the customer. A department memory has ninety memory sections each of which stores the unit cost information and the total amount of the transaction related to the commodity of a specific department. Three department level keys are provided to divide the department memory into three groups. When the first department level key is selected, the thirty department keys correspond to the first through thirtieth memory sections in the department memory. When the second department level key is selected, the thirty department keys correspond to thirty-first through sixtieth memory sections. When the third department level key is selected, the sixty-first through ninetieth memory sections correspond to the thirty department keys.

4 Claims, 4 Drawing Sheets

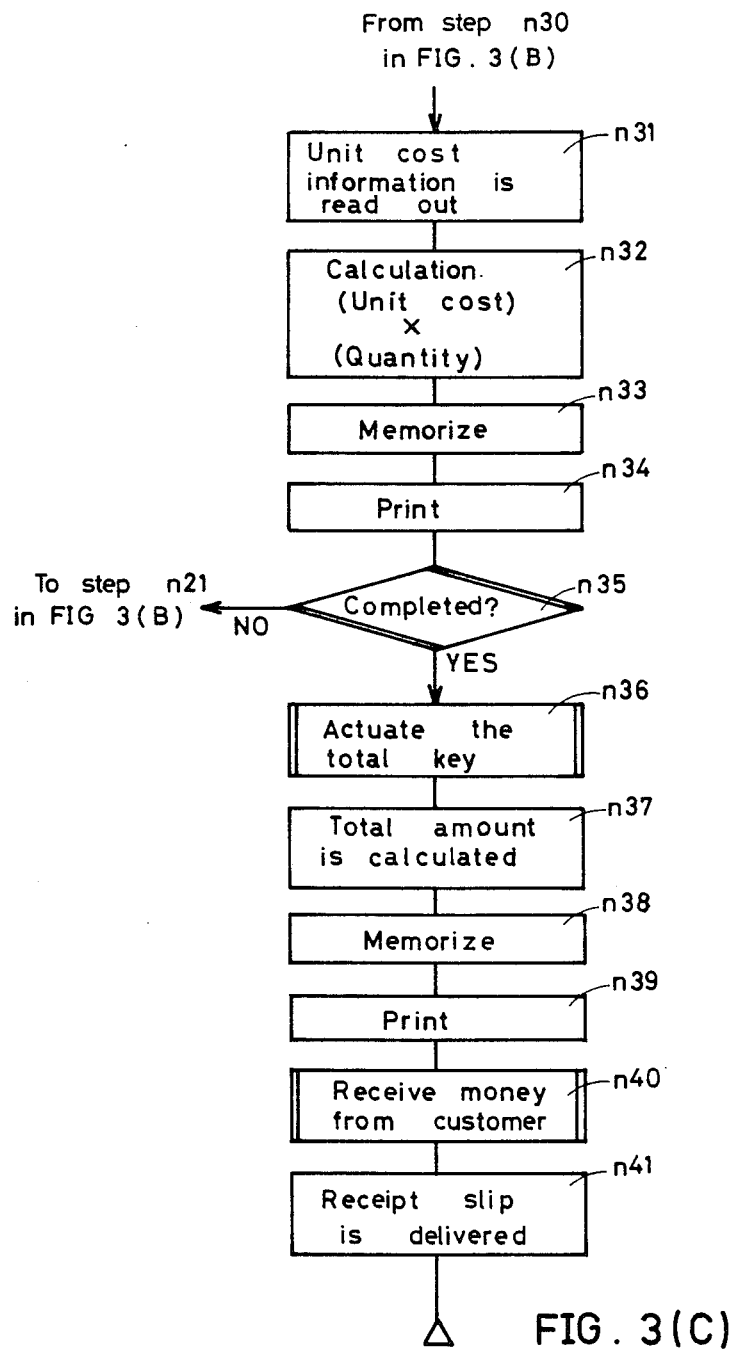

DEPARTMENT LEVEL SETTING IN AN ELECTRONIC CASH REGISTER

BACKGROUND OF THE INVENTION

1. Field of the Invention

The present invention relates to an electronic cash register and, more particularly, to an electronic cash register which includes a plurality of department keys for introducing the department information in the registration operation.

2. Description of the Prior Art

An electronic cash register has been developed which employs a plurality of department keys for introducing department information in the registration operation. In such an electronic cash register, the registration operation is conducted by inputting the quantity information (the number of items purchased by the customer) through the numeral keys, and then actuating one of the department keys to which the purchased commodity belongs. The electronic cash register functions to read out the unit cost information related to the selected department to calculate the amount of the commodity and update the total amount accumulated in the department memory. Department keys are required for each of the deparments to be specified. Accordingly, in the conventional electronic cash register, it is impossible to increase the number of departments without creating difficulty in operating the electronic cash register.

Further, it is possible for the unit cost to change depending on the current time information even though the commodity does not change. If another department key is assigned to the commodity when the unit cost is to be changed, the number of department keys becomes considerably large. This may result in an erroneous input operation.

OBJECTS AND SUMMARY OF THE INVENTION

Accordingly, an object of the present invention is to provide an electronic cash register which ensures an accurate registration operation.

Another object of the present invention is to provide an electronic cash register which has a large number of department memory sections with a relatively small number of department keys.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, a department level key is provided in order to assign two or more meanings to each of the department keys. In a preferred form, thirty (30) department keys are provided, and the department memory has ninety (90) memory sections. The department level key sets three levels for each of the thirty (30) department keys. The thirty (30) department keys in the first level correspond to the first through thirtieth memory sections in the department memory. The thirty (30) department keys in the second level correspond to the thirty-first through sixtieth memory sections in the department memory. The thirty (30) department keys in the third level correspond to the sixty-first through ninetieth memory sections in the department memory.

BRIEF DESCRIPTION OF THE DRAWINGS

The present invention will be better understood from the detailed description given hereinbelow and the accompanying drawings wherein.

DESCRIPTION OF THE PREFERRED EMBODIMENTS

Figures 1, 2:
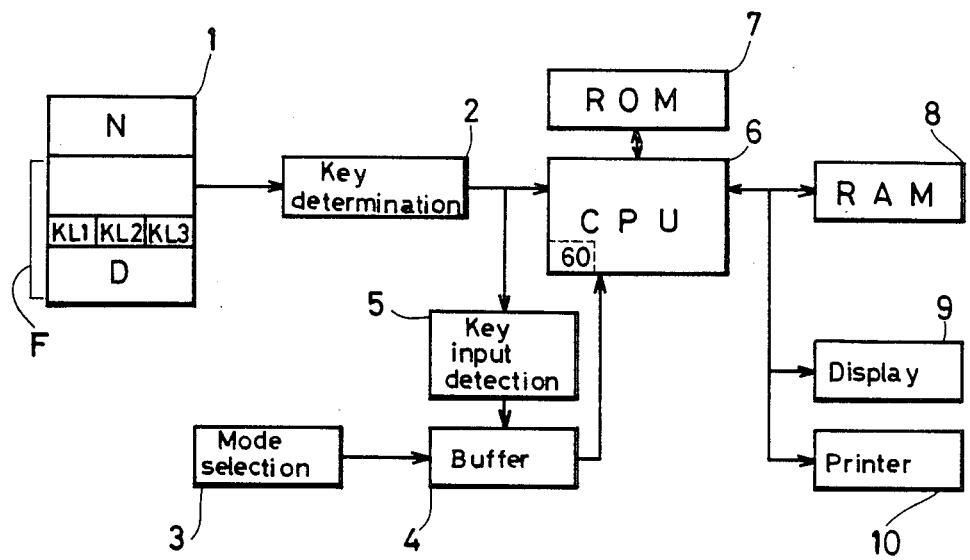
FIG. 1 is a block diagram of an embodiment of an electronic cash register of the present invention.
FIG. 2 is a schematic view showing a construction of an essential part of a random access memory (RAM) included in the electronic cash register of FIG. 1.

An electronic cash register of FIG. 1 includes a key input panel 1 having numeral keys N and function keys F. The function keys F include thirty (30) department keys D, and three department level keys KL1, KL2 and KL3. An output signal of the key input panel 1 is introduced into a key determination circuit 2 which determines the type of actuated key. A mode selection switch 3 is provided for selectively placing the electronic cash register in the normal registration mode and the preset mode. An output signal of the mode selection switch 3 is applied to a buffer memory 4. The selected mode data, which is temporarily stored in the buffer memory 4, is introduced into and memorized in a mode setting section 60 in a central processing unit (CPU) 6 in response to a control signal developed from a key input detection circuit 5 which develops the control signal when any one of the keys in the key input panel 1 is actuated.

The electronic cash register of FIG. 1 further includes a read only memory (ROM) 7 which stores programs for controlling the registration operation and the preset operation. A random access memory (RAM) 8 is connected to the central processing unit (CPU) 6 so as to memorize the transaction data introduced through the key input panel 1. The random access memory (RAM) 8 has a memory area for storing the data department by department. A display unit 9 and a printer unit 10 are connected to the central processing unit (CPU) 6 for displaying and printing out the registered data.

FIG. 2 shows an essential part of the random access memory (RAM) 8. The random access memory (RAM) 8 includes the department memory area which has ninety (90) department sections. The first through thirtieth department sections (ML1) correspond to each of the thirty (30) department keys D when the first level L1 is selected by the department level key KL1. The thirty-first through sixtieth department sections (ML2) correspond to each of the thirty (30) department keys D when the second level L2 is selected by the department level key KL2. The sixty-first through ninetieth department sections (ML3) correspond to each of the thirty (30) department keys D when the third level L3 is selected by the department level key KL3. Each department section includes a first portion p for storing the unit cost information, and a second portion t for accumulating the transaction data.

The random access memory (RAM) 8 futher includes an auto/manual mode memory area b for memorizing the level selection mode related to the department level keys KL1, KL2 and KL3.

When the data "1" is set in the auto/manual mode memory area b, the electronic cash register is placed in the department level auto return mode, wherein the department level is always returned automatically to the base level, for example the first level L1 upon every completion of the registration operation of one commodity. Contrarily, when the data "0" is set in the auto/manual mode memory area b, the electronic cash register is placed in the department level manual change mode, wherein the selected department level is maintained until a new department level is manually selected by the department level keys KL1, KL2 and KL3.

The random access memory (RAM) 8 also includes a department level memory area c. The department level memory area c stores the selected department level in the department level manual change mode. The stored deparment level is not changed until a new department level is manually selected by the department level keys KL1, KL2 and KL3. The department level memory area c is cleared when the main power supply is thrown, or when the operation is shifted from the department level auto return mode to the department level manual change mode. In another preferred form, the base mode, for example the first level L1 is automatically written into the department level memory area c when the main power supply is being thrown, or when the operation is shifted from the department level auto return mode to the department level manual change mode.

Figure 3A:
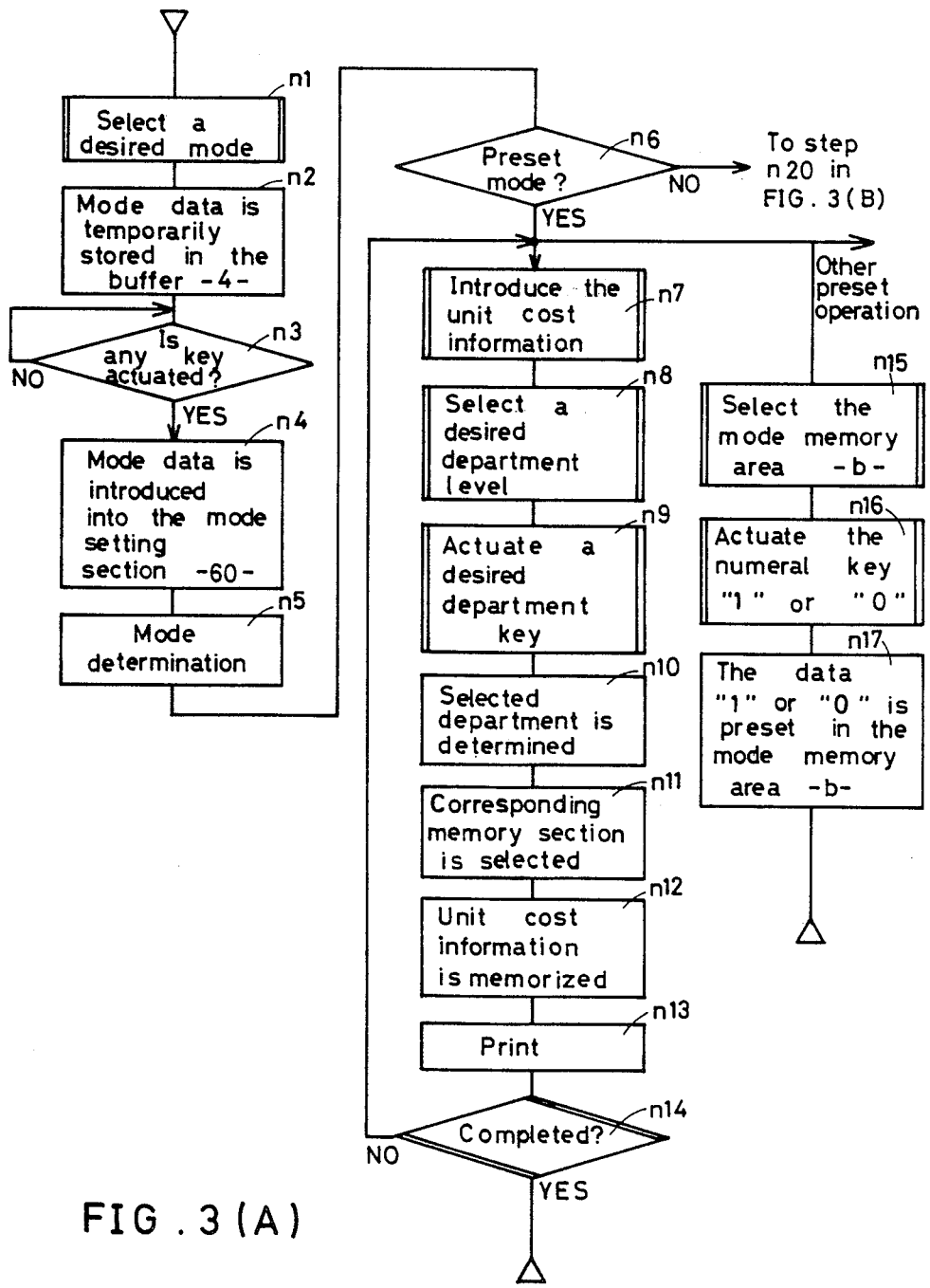
FIGS. 3(A), 3(B) and 3(C) are flow charts for explaining an operational mode of the electronic cash register of FIG. 1.
Figure 3:
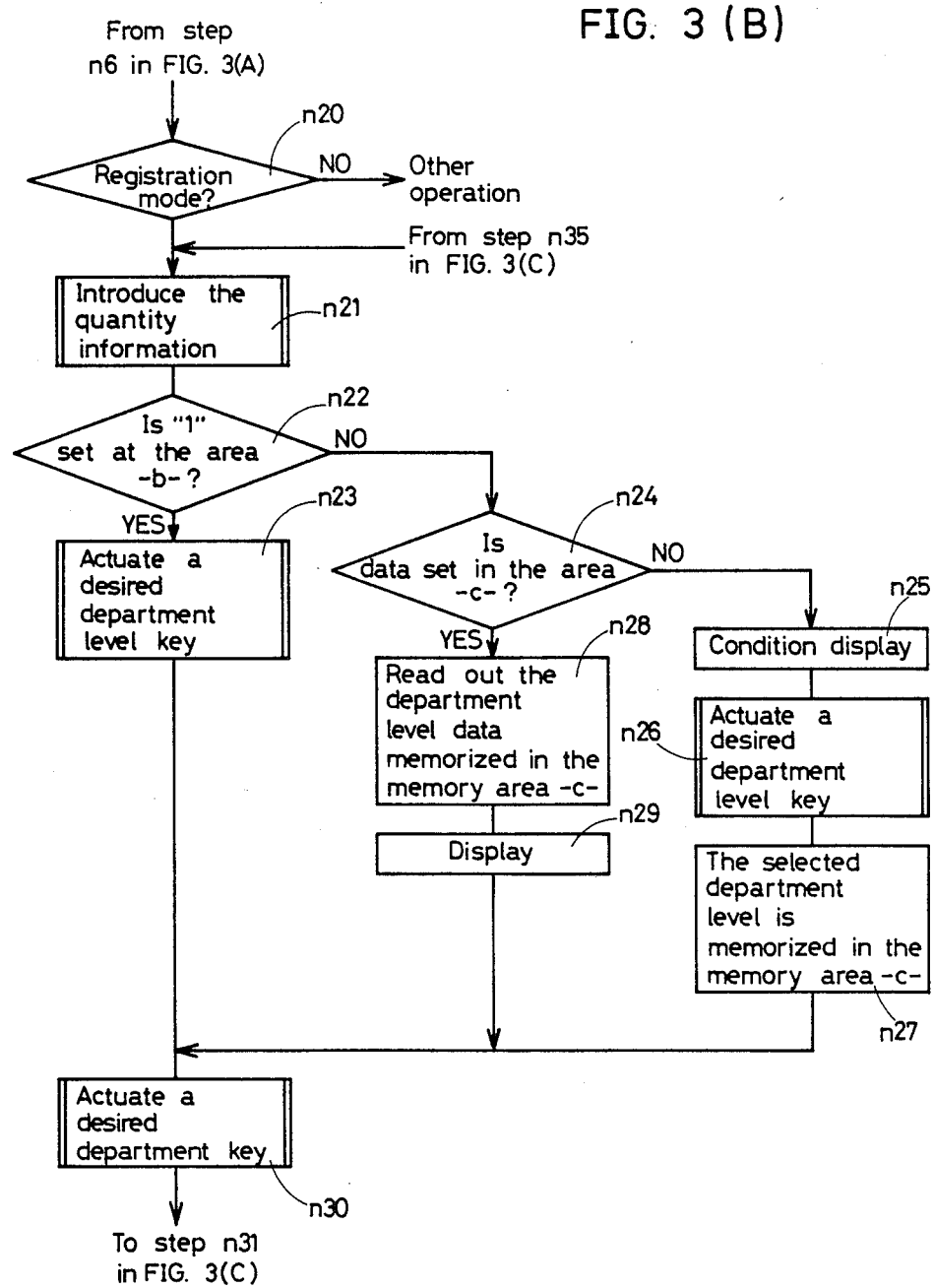

An operational mode of the electronic cash register of FIG. 1 will be described with reference to FIGS. 3(A), 3(B) and 3(C).

A desired operation mode is first selected through the use of the mode selection switch 3 (step n1) between the normal registration mode and the preset mode. The selected operation mode data is temporarily stored in the buffer memory 4 (step n2). Under these conditions, when any one of the keys included in the key input panel 1 is actuated (step n3), the key input detection circuit 5 develops the control signal so as to apply the mode information from the buffer memory 4 to the mode setting section 60 of the central processing unit (CPU) 6 (step n4). The central processing unit (CPU) 6 determines the selected operation mode (step n5). When the preset mode is determined, the operation is advanced from the step n6 to the step n7.

In the preset mode, the unit cost information is first introduced through the use of the numeral keys N (step n7). Then, one of the department level keys KL1, KL2 and KL3 is actuated to determine the department level (step n8), and then a desired department key D is actuated (step n9) to indicate the department to which the commodity belongs. More specifically, when the first through thirtieth departments are selected, the first department level key KL1 is actuated. When the thirty-first through sixtieth departments should be selected, the second department level key KL2 is actuated. When the sixty-first through ninetieth departments should be selected, the third department level key KL3 is actuated. The central processing unit (CPU) 6 determines the selected department in accordance with the department level information introduced at the step n8, and the department key information introduced at the step n9 (step n10). Then, the first portion p corresponding to the selected department is selected (step n11), and the unit cost information introduced at the step n7 is applied to the selected first portion p and stored therein (step n12). The printer unit 10 prints out, onto a receipt slip etc., the department number and the preset unit cost (step n13). The operation is repeated to preset the unit cost data for each of the departments (step n14).

The data preset in the auto/manual mode memory area b is conducted in accordance with the flow of the steps n15–n17. The auto/manual mode memory area b is selected when a specific key included in the function keys F is actuated (step n15). Thereafter, when the numeral key "1" is actuated (step n16), the data "1" is set in the auto/manual mode memory area b (step n17). The data "1" places the electonic cash register in the department level auto return mode. When the numeral key "0" is actuated (step n16), the data "0" is set in the auto/manual mode memory area b (step 17) so as to place the electronic cash register in the department level manual change mode.

When the electronic cash register is placed in the normal registration mode through the use of the mode selection switch 3 (step n1), the registration mode is determined at the step n20 as shown in FIG. 3(B). The quantity information (the number of the items purchased by the customer) is first introduced into the central processing unit (CPU) 6 through the use of the numeral keys N (step n21). The central processing unit (CPU) 6 checks whether the data "1" is preset in the auto/manual mode memory area b (step n22). When the data "1" is set in the auto/manual mode memory area b, the operation is advanced to the step n23 to wait the actuation of any of the department level keys KL1, KL2 and KL3 (step n23). When one of the department level keys KL1, KL2 and KL3 is actuated, and one of the department keys D is actuated (step n30), the central processing unit (CPU) 6 determines the selected department number, and reads out the unit cost information from the first portion p of the corresponding department section (step n31) as shown in FIG. 3(C). The thus read out unit cost is multiplied by the quantity which has been introduced at the step n21 (step n32). The calculation result (subtotal amount related to the commodity) is introduced into and accumulated in the second portion t of the selected department section (step n33). The thus registered transaction data is printed out onto a receipt slip and/or a journal paper by the printer unit 10 (step n34). The above-mentioned operation (step n21 through step n34) is repeated to register the transaction data related to one customer (step n35). When the registration operation related to one customer is completed, the total key is actuated (step n36). The central processing unit (CPU) 6 calculates the total amount purchased by the customer (step n37). The total number is introduced into and memorized in a preselected portion of a random access memory (RAM) 8 for accumulation purposes (step n38), and is printed out onto the receipt slip and/or the journal paper (step n39). The clerk receives money from the customer with reference to the total amount now obtained (step n40), and the change is calculated, if any, and the receipt slip is handed to the customer (step n41).

That is, in the auto return mode, the operation is advanced from the step n22 to the step n23. Contrarily, when the data "0" is set in the auto/manual mode memory area b, that is, in the department level manual change mode, the operation is advanced from the step n22 to the step n24, where a determination is carried out whether any data is memorized in the department level memory area c. As already discussed above, no data has been set in the department level memory area c at a time when the power supply switch is thrown or when the system is shifted from the auto return mode to the department level manual change mode. In this case, the determination result (no data in the area c) is displayed on the display unit 9 (step n25). The operator actuates a desired department level key KL1, KL2 or KL3 (step n26) so that the selected department level is memorized in the department level memory area c (step n27). The following operation is similar to that conducted in the auto return mode (steps n30 to n41).

In the case where data is set in the department level memory area c (step n24), the set data is read out (step n28), and the read out department level is displayed on the display unit 9 (step n29). Then, the operation is advanced to the step n30. That is, in the department level manual change mode, the department level key KL1, KL2 or KL3 is not operated once the department level is selected. If the department level is to be changed while in the manual change mode, a specific key is operated to change the department level data stored in the department level memory area c.

The department level auto return mode is effective in the case where the department levels L1, L2 and L3 are provided for commodities of different sizes and of the same kind. More specifically, one of the department keys D is used for identifying a large size commodity when the department level key KL1 is actuated, a middle size commodity when the department level key KL2 is actuated, and a small size commodity when the department level key KL3 is actuated. The department level manual change mode is effective in the case where the unit cost varies depending on the current time. More specifically, the department level key KL1 is actuated when the store opens. Then, the department level key KL2 is actuated at a preselected time so that another unit cost data is read out in response to an actuation of a specific department key in the following time period. Further, the department level key KL3 is actuated at another preselected time so that a still further unit cost data is read out in response to the department key in the following time period.

Although three department level keys KL1, KL2 and KL3 are provided in the foregoing embodiments, one department level key can be employed to shift to other department levels. The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
   a CPU for performing transaction functions;
   keyboard means electrically interconnected to said CPU, for introducing information therein including,
      a plurality of numerical keys,
      a plurality of department keys, and
      a plurality of department level keys;
   department memory means including a plurality of department memory sections for storing unit cost and accumulated transaction information, each section identifying a particular commodity to be sold, each section comprising a first area for storing unit cost information related to said commodity, and a second area for storing accumulated transaction information related to said commodity,
   said department memory means being divided into a plurality of department level groups, each group being associated with a particular department level key, and consisting of a specific number of said department memory sections, said specific number being equal to the number of said department keys,
   such that each of said department memory sections may be accessed by actuation of a corresponding department key in conjunction with the actuation of the particular department level key associated with said section.

2. An electronic cash register as claimed in claim 1, further including mode selection means for selecting a preset mode or a registration mode,
   said numerical keys being used in said preset mode for inputting unit cost information to said department memory sections, and in said registration mode for inputting quantity information to said CPU related to a particular transaction.

3. An electronic cash register as claimed in claim 2, wherein said department memory means further includes: an auto/manual mode memory area for automatically enabling said department keys to address a particular department level group over a series of transaction occurrences when said auto/manual mode memory area is activated.

4. An electronic cash register as claimed in claim 1, wherein said department memory means further includes: an auto/manual mode memory area for automatically enabling said department keys to address a particular department level group over a series of transaction occurrences when said auto/manual mode memory area is activated.

* * * * *